United States Patent
Nguyen et al.

(10) Patent No.: US 6,301,473 B1
(45) Date of Patent: Oct. 9, 2001

(54) CALL TRANSFER ACTIVATION INDICATOR IN A RADIO TELECOMMUNICATIONS NETWORK

(75) Inventors: Thien Nguyen, Montreal; Viet Nguyen, Mississauga, both of (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/118,428

(22) Filed: Jul. 17, 1998

(51) Int. Cl.[7] .............................. H04Q 7/00; H04Q 7/38
(52) U.S. Cl. .................... 455/417; 455/414; 455/433; 379/212.01
(58) Field of Search ................................ 455/414, 417, 455/433, 445, 432, 459; 379/211.02, 212.01

(56) References Cited

U.S. PATENT DOCUMENTS

| | | | |
|---|---|---|---|
| 5,577,103 | * 11/1996 | Foti | 379/59 |
| 5,579,375 | * 11/1996 | Ginter | 455/417 |
| 5,657,382 | * 8/1997 | Tamagawa et al. | 379/211 |
| 5,678,195 | 10/1997 | Suikkola et al. | 455/54.1 |
| 5,711,002 | * 1/1998 | Foti | 455/433 |
| 5,784,442 | * 7/1998 | Foti | 379/114 |
| 5,839,065 | * 11/1998 | Joensuu et al. | 455/414 |
| 5,845,207 | * 12/1998 | Amin et al. | 455/414 |
| 5,867,784 | * 2/1999 | Lantto | 455/432 |
| 5,905,954 | * 5/1999 | Nguyen | 455/433 |
| 5,966,653 | * 10/1999 | Joensuu et al. | 455/414 |
| 5,978,681 | * 11/1999 | Bertacchi | 455/445 |

FOREIGN PATENT DOCUMENTS

WO 97/50237  12/1997  (WO).
WO 98/23099   5/1998  (WO).

* cited by examiner

*Primary Examiner*—Lee Nguyen
*Assistant Examiner*—Simon Nguyen
(74) *Attorney, Agent, or Firm*—Smith, Danamraj & Youst, P.C.

(57) ABSTRACT

A method of sending a call transfer notification (CTN) to a mobile station (MS) in a radio telecommunications network. The CTN indicates that a call transfer feature is activated, and is displayed on the MS display until the call transfer feature is deactivated or the MS is turned off. The network includes a serving Mobile Switching Center (MSC) which serves the MS, and a Home Location Register (HLR) which stores a subscriber profile associated with the MS. The method begins by storing in the subscriber profile, a CTN Active parameter that indicates whether or not the CTN should be sent to the MS whenever the MS is powered up. A CTN Type parameter is also stored in the subscriber profile and indicates which type of call transfer feature is activated. When the HLR is notified that the MS has been powered up, the CTN Active parameter is checked in the subscriber profile to determine whether the CTN should be sent to the MS. The CTN Type parameter is then checked to determine which type of call transfer feature is activated. The CTN is then sent from the serving MSC to the MS in a Short Message Service (SMS) display message which includes an indication of which type of call transfer feature is activated. If the call transfer feature is deactivated, the CTN is removed from the MS display.

8 Claims, 2 Drawing Sheets

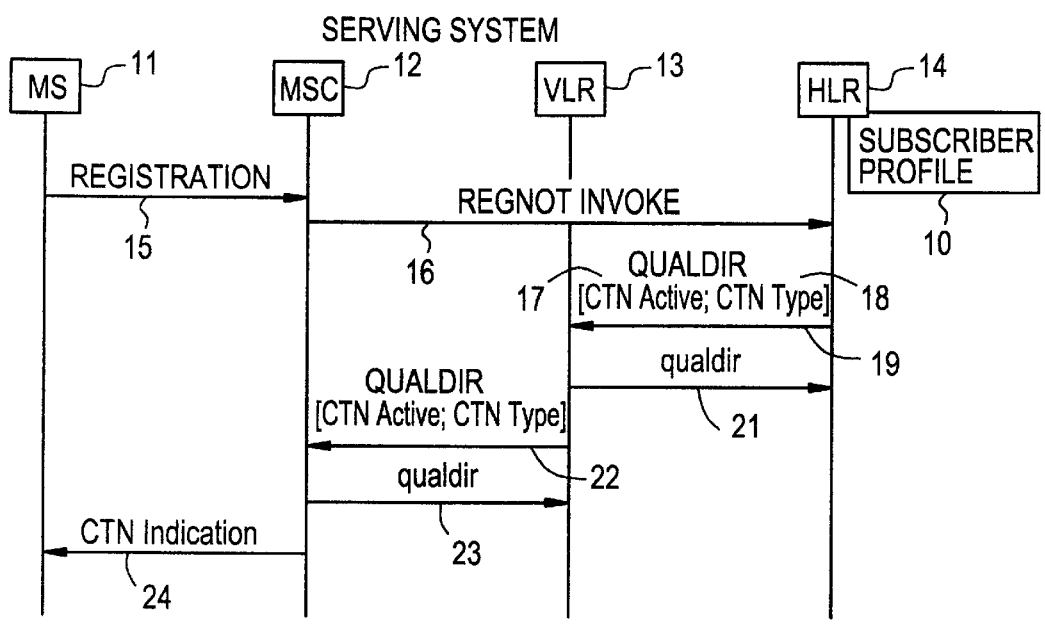
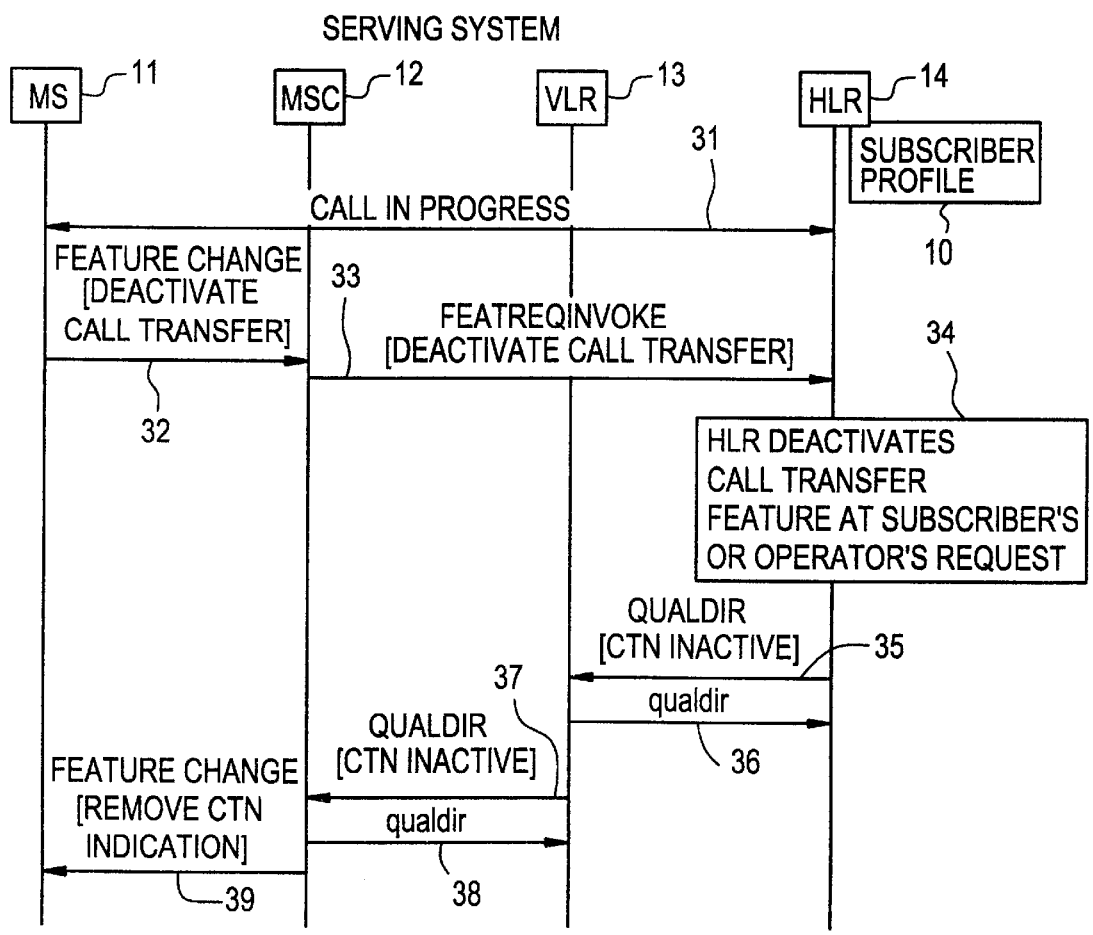

FIG. 2

| PROFILE | | | |
|---|---|---|---|
|  | Type | Reference | Notes |
|  |  |  |  |
| AuthenticationCapability | 0 | 6.5.2.8 | a |
| CallingFeaturesIndicator | 0 | 6.5.2.20 | b |
| CarrierDigits | 0 | 6.5.2.28 | c |
| DMH_AccountCodeDigits | 0 | 6.5.2.59 | d |
| DMH_AlternateBillingDigits | 0 | 6.5.2.60 | d |
| DMH_BillingDigits | 0 | 6.5.2.61 | d |
| GeographicAuthorization | 0 | 6.5.2.68 | e |
| MessageWaitingNotificationCount | 0 | 6.5.2.78 | f |
| MessageWaitingNotificationType | 0 | 6.5.2.79 | g |
| MobileDirectoryNumber | 0 | 6.5.2.80 | d |
| OriginationIndicator | 0 | 6.5.2.89 | h |
| OriginationTriggers | 0 | 6.5.2.90 | i |
| PACAIndicator | 0 | 6.5.2.91 | j |
| PreferredLanguageIndicator | 0 | 6.5.2.96 | k |
| RestrictionDigits | 0 | 6.5.2.113 | l |
| RoutingDigits | 0 | 6.5.2.114 | m |
| SMS_OriginationRestrictions | 0 | 6.5.2.136 | n |
| SMS_TerminationRestrictions | 0 | 6.5.2.138 | o |
| SPIN/PIN | 0 | 6.5.2.139 | p |
| SPINI/Triggers | 0 | 6.5.2.140 | q |
| TerminationRestrictionCode | 0 | 6.5.2.157 | r |
| TerminationTriggers | 0 | 6.5.2.159 | s |
| CallTransferNotificationActive | 0 |  |  |
| CallTransferNotificationType | 0 |  |  |

CALL TRANSFER ACTIVATION INDICATOR IN A RADIO TELECOMMUNICATIONS NETWORK

BACKGROUND OF THE INVENTION

1. Technical Field of the Invention

This invention relates to telecommunication systems and, more particularly, to a method in a radio telecommunications network of notifying a subscriber that a call transfer feature is activated.

2. Description of Related Art

In existing radio telecommunications networks, a mobile subscriber who activates a call transfer feature receives an immediate indication that the feature has been activated. Thereafter, however, the subscriber must remember that the feature is activated. There is no indication, for example, upon subsequent powering up of the mobile station that the call transfer feature is activated. Thus, the feature may be activated while the subscriber is not aware of this fact. This can be very inconvenient, especially when immediate call transfer (or unconditional call transfer) is activated. In this case, calls terminating to this subscriber are transferred to a pre-defined forward-to-number (C-number) without the subscriber's awareness.

In the prior art, U.S. Pat. No. 5,077,789 to Clark and the inter-system signaling specification ANSI-41 (6.9.2 CNIR Interaction with Call Forwarding Unconditional (CFU)) both teach methods of providing an abbreviated alert signal to a subscriber's phone when a call is forwarded to another number. However, these methods do not provide the subscriber with an indication that a call transfer feature is activated as soon as the mobile station is powered up, and for the entire time the mobile station is turned on. With the existing methods, the subscriber is only alerted after he has missed a call. In addition, the existing methods utilize valuable network resources such as paging resources and voice channels to page the mobile station, obtain a response, and send the abbreviated alert signal.

In order to overcome the disadvantage of existing solutions, it would be advantageous to have a method of notifying a subscriber that a call transfer feature is activated whenever the subscriber powers up the mobile station. Such an indication would remain active for the entire time the mobile station is turned on, and would provide the subscriber with the ability to deactivate the call transfer feature prior to having any incoming calls inadvertently transferred. In addition, the method would not utilize network paging resources or voice channels. The present invention provides such a method.

SUMMARY OF THE INVENTION

The present invention is a method in a radio telecommunications network of notifying a subscriber that a call transfer feature is activated. The method provides a display or a tone to indicate whether or not the call transfer feature is activated whenever the subscriber powers up his mobile station, and for the entire time the mobile station is turned on.

Thus, the present invention is a method of sending a call transfer notification (CTN) to a mobile station (MS) in a radio telecommunications network, the CTN indicating that a call transfer feature is activated. The network includes a serving Mobile Switching Center (MSC) which serves the MS, and a Home Location Register (HLR) which stores a subscriber profile associated with the MS. The method begins by storing in the subscriber profile, a CTN Active parameter that indicates whether or not the CTN should be sent to the MS whenever the MS is powered up. A CTN Type parameter is also stored in the subscriber profile and indicates which type of call transfer feature is activated. When the HLR is notified that the MS has been powered up, the CTN Active parameter is checked in the subscriber profile to determine whether the CTN should be sent to the MS. This is followed by checking the CTN Type parameter in the subscriber profile to determine which type of call transfer feature is activated, and sending the CTN to the MS upon determining that the CTN should be sent to the MS whenever the MS is powered up. The CTN may include an indication of which type of call transfer feature is activated. The CTN may be sent to the MS in a Short Message Service (SMS) display message. If the call transfer feature is deactivated, either by the subscriber or the operator, the MS is notified of this fact, and the CTN indication is removed from the MS display.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 1 is a message flow diagram illustrating the flow of messages in a radio telecommunications network when a Call Transfer Notification (CTN) indication is sent to a mobile station (MS) upon initial powering up of the MS;

FIG. 2 is a table of parameters in a subscriber profile which has been modified in accordance with the teachings of the present invention; and FIG. 3 is a message flow diagram illustrating the flow of messages in a radio telecommunications network when a call transfer feature is deactivated after the CTN indication has been sent to the MS.

DETAILED DESCRIPTION OF EMBODIMENTS

The method of the present invention provides an indication to the subscriber that a call transfer feature is activated whenever the subscriber powers up his mobile station. The indication remains active for the entire time the mobile station is turned on. In the preferred embodiment, the method is implemented by modifying the "Subscriber Profile" in the Home Location Register (HLR) (see IS41.5 Rev. C section 6.5.2.97), and utilizing new parameters from the modified profile in the Qualification Directive (QUALDIR) Invoke message, Qualification Request (qualreq) Return Result message, and Registration Notification (regnot) Return Result message. The subscriber profile is modified to include optional parameters Call Transfer Notification Active (CTN Active) and Call Transfer Notification Type (CTN Type). The CTN Active parameter indicates whether the subscriber is to be notified, upon mobile station power up or handoff, that a call transfer feature is activated. The CTN Type parameter indicates what type(s) of call transfer is/are activated, for example, U (unconditional), B (transfer on busy), or N (transfer on no answer).

FIG. 1 is a message flow diagram illustrating the flow of messages in a radio telecommunications network when a Call Transfer Notification (CTN) indication is sent to a mobile station (MS) 11 upon initial powering up of the MS. In the illustrated example, the MS 11 is operating within the service area of a serving system which includes a Mobile Switching Center (MSC) 12 and a Visitor Location Register (VLR) 13. The network also includes a Home Location Register (HLR) 14 in which the subscriber profile 10 is maintained.

When the subscriber powers up the MS, a registration message 15 is sent from the MS 11 to the MSC 12. The MSC sends a Registration Notification (RegNot) message 16 to the HLR 14 to access the subscriber's profile. The HLR first checks the subscriber profile 10 for the CTN Active parameter 17. If the CTN Active parameter indicates that the subscriber is to be notified upon mobile station power up that a call transfer feature is activated, the HLR then checks the subscriber profile for the CTN Type parameter 18 to determine which, if any, call transfer features are activated.

The CTN Active parameter 17 and the CTN Type parameter 18 are then sent in a Qualification Directive (QUALDIR) Invoke message 19 from the HLR 14 to the VLR 13. The VLR returns a Qualification Directive (qualdir) Return Result message 21 to the HLR and sends a QUALDIR Invoke message 22 to the serving MSC 12. The serving MSC returns a Qualification Directive (qualdir) Return Result message 23 to the VLR and sends a CTN Indication 24 to the MS 11. In the preferred embodiment, the CTN Indication is sent to the MS as a display. This may be done via a Short Message Service (SMS) message or other appropriate message. The CTN Indication may also be sent as a tone in a manner similar to the alert pip tones utilized in a Message Waiting Notification (MWN) to inform a subscriber that he has a message waiting in voice mail (IS41.3C, Section 6.13.3). ANSI-41 and IS-41.3C are hereby incorporated by reference herein.

FIG. 2 is a table of parameters in a subscriber profile 10 which has been modified in accordance with the teachings of the present invention. The CTN Active parameter 17 and the CTN Type parameter 18 are added to the subscriber profile. In various message scenarios, these parameters may be added to the Qualification Directive (QUALDIR) Invoke message, Qualification Request (qualreq) Return Result message, and Registration Notification (regnot) Return Result message in order to provide a CTN Indication to the served MS.

FIG. 3 is a message flow diagram illustrating the flow of messages in a radio telecommunications network when a call transfer feature is deactivated after the CTN indication has been sent to the MS. At step 31, a call is in progress, and the CTN indication is displayed on the MS indicating that a call transfer feature is activated. At 32, the subscriber indicates that he wishes to deactivate the call transfer feature. This feature change is sent to the MSC 12 which sends a Feature Request (FEATREQ) Invoke message 33 to the HLR 14. At step 34, the HLR deactivates the call transfer feature in accordance with the subscriber's request. The call transfer feature may also be deactivated in the HLR at the operator's request.

The setting of the CTN Active parameter 17 is changed to indicate that Call Transfer Notification is inactive. The CTN Active parameter 17 is then sent in a QUALDIR Invoke message 35 from the HLR 14 to the VLR 13. The VLR returns a qualdir Return Result message 36 to the HLR and sends a QUALDIR Invoke message 37 to the serving MSC 12. The serving MSC returns a qualdir Return Result message 38 to the VLR, and at 39 sends a response to the feature change request to the MS 11 removing the CTN indication from the MS display.

It is thus believed that the operation and construction of the present invention will be apparent from the foregoing description. While the method shown and described has been characterized as being preferred, it will be readily apparent that various changes and modifications could be made therein without departing from the spirit and scope of the invention as defined in the following claims.

What is claimed is:

1. A method of sending a call transfer notification (CTN) to a mobile station (MS) in a radio telecommunications network wherein there are a plurality of types of call transfer features, said CTN indicating that a call transfer feature is activated, and said network including a serving Mobile Switching Center (MSC) which serves the MS and a Home Location Register (HLR) which stores a subscriber profile associated with the MS, said method comprising the steps of:

storing in the subscriber profile in the HLR, a CTN Active parameter that indicates whether or not the CTN should be sent to the MS whenever the MS is powered up;

storing in the subscriber profile in the HLR, a CTN Type parameter that indicates which type of call transfer feature is activated for the MS;

notifying the HLR that the MS has been powered up;

checking the CTN Active parameter in the subscriber profile to determine in the HLR whether the CTN should be sent to the MS whenever the MS is powered up;

determining in the HLR which type of call feature is activated for the MS by checking the CTN Type parameter in the subscriber profile; and sending the CTN to the MS upon determining that the CTN should be sent to the MS whenever the MS is powered up, in order to provide an indication to a user of the mobile station that the type of call transfer feature determined in the HLR is currently activated for the mobile station.

2. The method of sending a call transfer notification (CTN) to a mobile station (MS) of claim 1 wherein the step of sending the CTN to the MS includes sending an indication of which type of call transfer feature is activated.

3. The method of sending a call transfer notification (CTN) to a mobile station (MS) of claim 2 wherein the step of sending the CTN to the MS includes sending the CTN to the MS in a Short Message Service (SMS) display message.

4. The method of sending a call transfer notification (CTN) to a mobile station (MS) of claim 3 further comprising the step of displaying the CTN on the MS as long as the MS is turned on.

5. The method of sending a call transfer notification (CTN) to a mobile station (MS) of claim 1 wherein the step of sending the CTN to the MS includes sending the CTN to the MS as an alert pip tone.

6. The method of sending a call transfer notification (CTN) to a mobile station (MS) of claim 1 wherein the step of sending the CTN to the MS includes sending a Qualification Directive (QUALDIR) Invoke message from the HLR to the serving MSC, said QUALDIR Invoke message including the CTN Active parameter and the CTN Type parameter.

7. The method of sending a call transfer notification (CTN) to a mobile station (MS) of claim 6 wherein the step of sending the CTN to the MS includes sending a Short Message Service (SMS) display message from the serving MSC to the MS.

8. The method of sending a call transfer notification (CTN) to a mobile station (MS) of claim 7 further comprising the step of displaying the CTN on the MS as long as the MS is turned on.

* * * * *